(12) United States Patent
Chen et al.

(10) Patent No.: US 11,215,855 B2
(45) Date of Patent: Jan. 4, 2022

(54) SCREEN ANTI-PEEPING PROTECTION LAYER AND TOUCH DISPLAY DEVICE

(71) Applicant: Coretronic Corporation, Hsin-Chu (TW)

(72) Inventors: Ping-Yen Chen, Hsin-Chu (TW); Chung-Yang Fang, Hsin-Chu (TW); Yu-Wei Liang, Hsin-Chu (TW); Yin-Jen Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/904,539

(22) Filed: Jun. 17, 2020

(65) Prior Publication Data
US 2020/0400979 A1 Dec. 24, 2020

(30) Foreign Application Priority Data
Jun. 24, 2019 (CN) .......................... 201920952187.3

(51) Int. Cl.
*G02F 1/13* (2006.01)
*G02F 1/1333* (2006.01)
*G02F 1/1343* (2006.01)
*G02F 1/1335* (2006.01)

(52) U.S. Cl.
CPC ........ *G02F 1/1323* (2013.01); *G02F 1/13338* (2013.01); *G02F 1/133536* (2013.01); *G02F 1/134309* (2013.01)

(58) Field of Classification Search
CPC ............... G02F 1/1323; G02F 1/13338; G02F 1/134309; G02F 1/133536
USPC .......................................................... 349/12
See application file for complete search history.

(56) References Cited

U.S. PATENT DOCUMENTS

| | | | |
|---|---|---|---|
| 10,126,575 B1 | 11/2018 | Robinson et al. | |
| 2010/0110326 A1* | 5/2010 | Isobe | G02F 1/1323 349/58 |
| 2018/0210243 A1* | 7/2018 | Fang | G02B 6/0055 |
| 2019/0227366 A1* | 7/2019 | Harrold | G02F 1/13363 |

* cited by examiner

*Primary Examiner* — Charles S Chang
(74) *Attorney, Agent, or Firm* — JCIPRNET

(57) ABSTRACT

The disclosure provides a screen anti-peeping protection layer arranged above a display panel. The screen anti-peeping protection layer includes a first polarizing layer, a second polarizing layer, a viewing angle adjusting layer and a touch sensing layer. The first polarizing layer and the second polarizing layer are sequentially arranged on a transmission path of a display beam which comes from the display panel. The viewing angle adjusting layer is arranged on the transmission path and located between the first polarizing layer and the second polarizing layer, and used for changing a range of an emitted light viewing angle of the display beam. The touch sensing layer is arranged on the transmission path, and located above the viewing angle adjusting layer and opposite to the first polarizing layer. The disclosure also provides a touch display device including the screen anti-peeping protection layer and the display panel as described above.

15 Claims, 7 Drawing Sheets

SCREEN ANTI-PEEPING PROTECTION LAYER AND TOUCH DISPLAY DEVICE

CROSS-REFERENCE TO RELATED APPLICATION

This application claims the priority benefit of China application serial no. 201920952187.3, filed on Jun. 24, 2019. The entirety of the above-mentioned patent application is hereby incorporated by reference herein and made a part of this specification.

BACKGROUND

Technical Field

The disclosure relates to a display technology, and more particularly to a screen anti-peeping protection layer and a touch display device with a touch function.

Description of Related Art

With the development of technology, touch display devices have become common electronic devices in daily life. At present, some display devices provide anti-peeping functions to protect the user's viewing privacy. However, if the touch display device is combined with the touch function and the anti-peeping function, the problems including that the touch recognition is reduced or the anti-peeping film falls off and the picture contrast is reduced may arise. Therefore, how to provide a touch display device with anti-peeping and touch functions and good display quality has become a subject to be studied.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a screen anti-peeping protection layer and a touch display device, which can protect the screen and adjust the emitted light viewing angle, and also have the advantages of avoiding touch misjudgment and maintaining good display picture quality.

Embodiments of the disclosure provide a screen anti-peeping protection layer arranged above the display panel. The screen anti-peeping protection layer includes a first polarizing layer, a second polarizing layer, a viewing angle adjusting layer and a touch sensing layer. The first polarizing layer and the second polarizing layer are sequentially arranged on a transmission path of a display beam, wherein the display beam comes from the display panel. The viewing angle adjusting layer is arranged on the transmission path and located between the first polarizing layer and the second polarizing layer, and used for changing a range of an emitted light viewing angle of the display beam. The touch sensing layer is arranged on the transmission path, and located above the viewing angle adjusting layer and opposite to the first polarizing layer.

Embodiments of the disclosure further provide a touch display device, including the display panel and the screen anti-peeping protection layer. The display panel is used for emitting a display beam. The screen anti-peeping protection layer is arranged on a transmission path of the display beam, and includes a first polarizing layer, a second polarizing layer, a viewing angle adjusting layer and a touch sensing layer. The first polarizing layer and the second polarizing layer are sequentially arranged on the transmission path. The viewing angle adjusting layer is arranged on the transmission path and located between the first polarizing layer and the second polarizing layer, and used for changing a range of an emitted light viewing angle of the display beam. The touch sensing layer is arranged on the transmission path, and located above the viewing angle adjusting layer and opposite to the second polarizing layer.

Based on the above, the screen anti-peeping protection layer of the disclosure has a touch function, and the touch display device includes the screen anti-peeping protection layer and the display panel as described above. The screen anti-peeping protection layer can provide a touch function, and protects the screen and adjusts the range of the emitted light viewing angle of the display panel. The touch sensing layer of the screen anti-peeping protection layer is arranged above the viewing angle adjusting layer, but the viewing angle adjusting layer is not adjacent to the touch sensing layer. The screen anti-peeping protection layer of the disclosure can avoid the touch misjudgment of the touch display device and maintain good display picture quality in different display modes.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
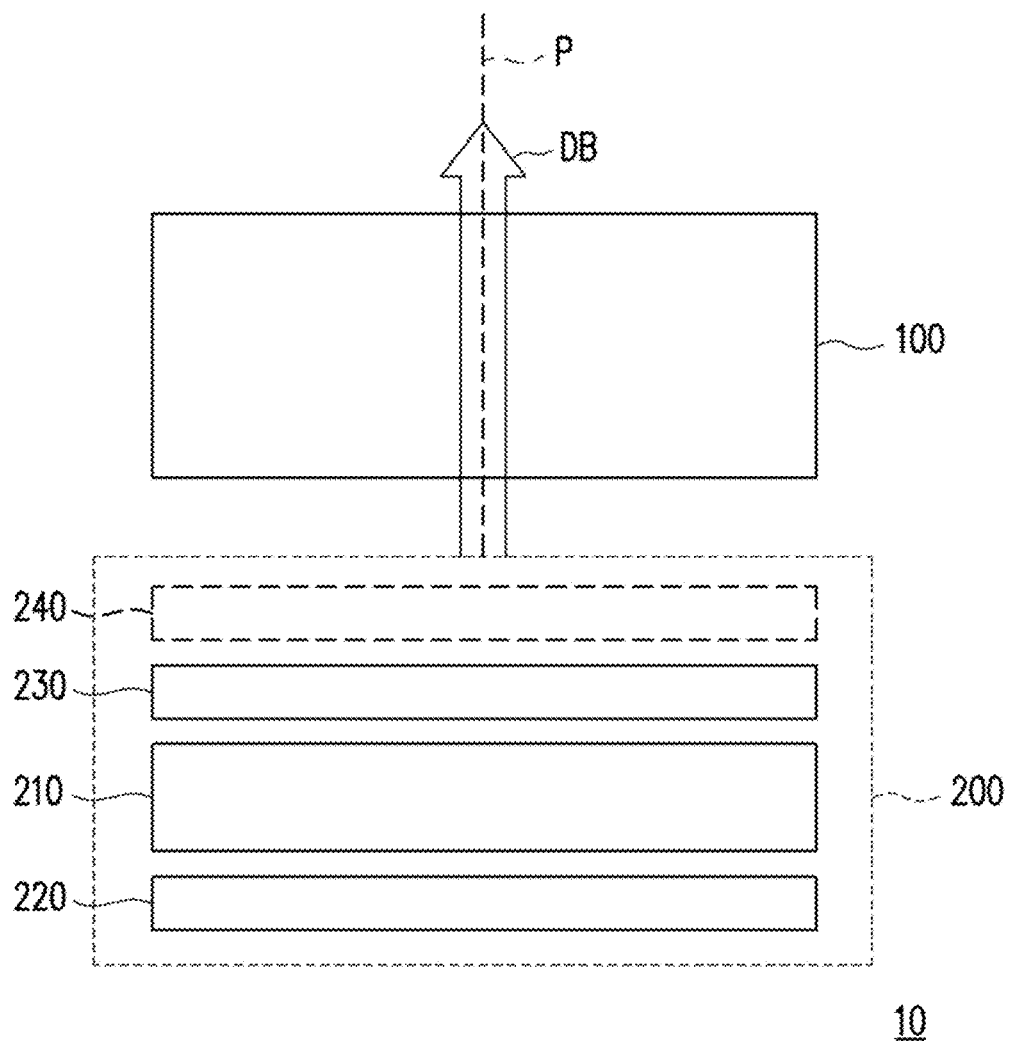
FIG. 1 is a schematic structural view of a touch display device according to an embodiment of the disclosure.

FIG. 1 is a schematic structural view of a touch display device according to an embodiment of the disclosure. Referring to FIG. 1, the touch display device 10 includes a screen anti-peeping protection layer 100 and a display panel 200. The display panel 200 is used for emitting a display beam DB and the screen anti-peeping protection layer 100 is arranged on a transmission path P of the display beam DB. In other words, the screen anti-peeping protection layer 100 is arranged above the display panel 200. The screen anti-peeping protection layer 100 has a touch function, a protection function, and a function of adjusting the emitted light viewing angle (light-emitting angle, for example) of the display beam DB, so that the touch display device 10 can provide at least two different viewing angle ranges, such as a normal viewing mode of a wide viewing angle and an anti-peeping mode of a narrow viewing angle.

Figure 2:
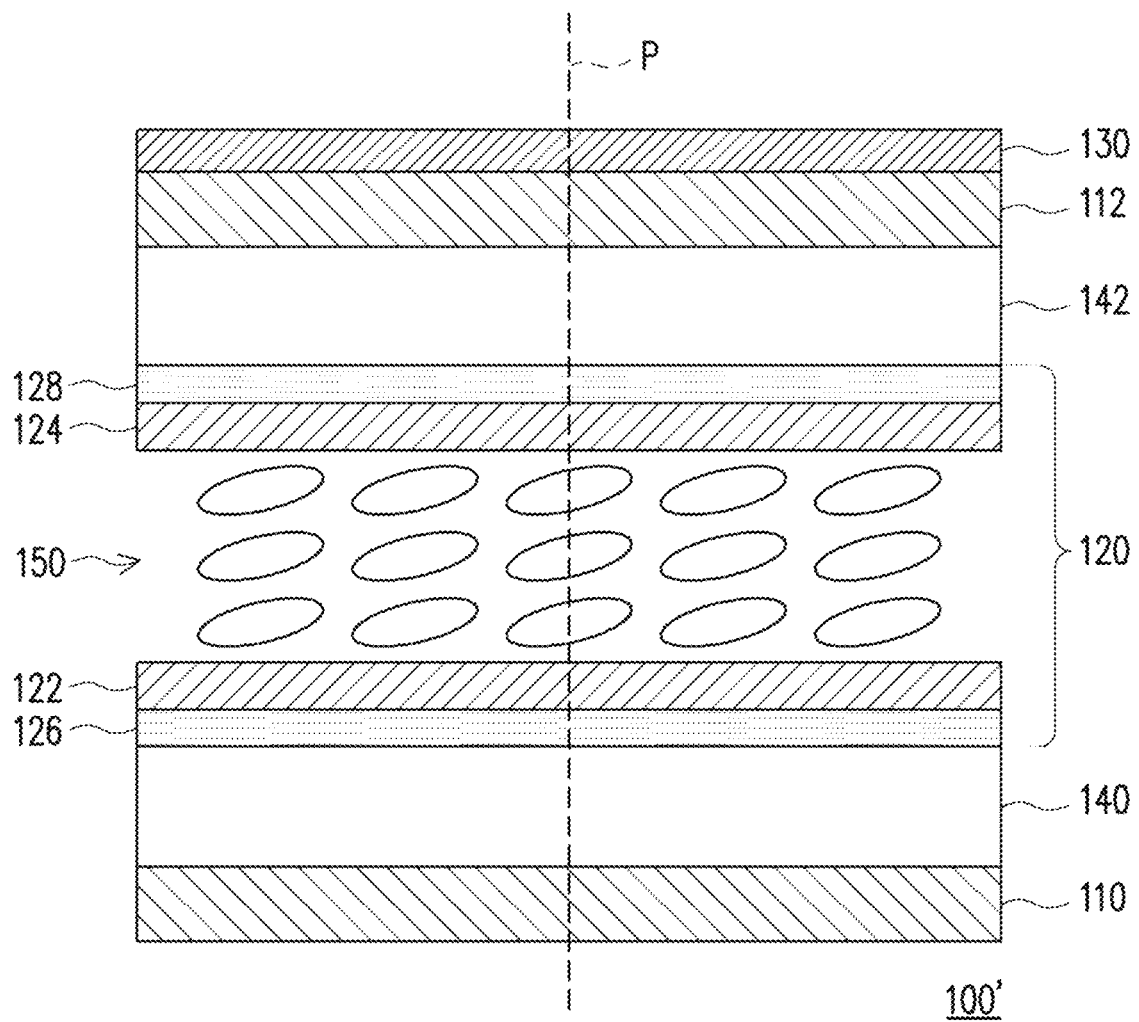
FIG. 2 is a schematic structural view of a screen anti-peeping protection layer according to an embodiment of the disclosure.

FIG. 2 is a schematic structural view of a screen anti-peeping protection layer according to an embodiment of the disclosure. Please refer to FIG. 1 and FIG. 2. The specific structure of the screen anti-peeping protection layer 100 of FIG. 1 can be, for example, the screen anti-peeping protection layer 100' shown in FIG. 2. The screen anti-peeping protection layer 100' includes at least a first polarizing layer 110, a second polarizing layer 112, a viewing angle adjusting layer 120 and a touch sensing layer 130. As described above, the display beam DB (central light beam, for example) comes from the display panel 200, and passes through the screen anti-peeping protection layer 100' along the transmission path P to leave the touch display device 10. The first polarizing layer 110 and the second polarizing layer 112 are sequentially arranged on the transmission path P of the display beam DB. The absorption axes of the first polarizing layer 110 and the second polarizing layer 120 are arranged in parallel or nearly in parallel. For example, the angle between the absorption axes of the first polarizing layer 110 and the second polarizing layer 120 falls within the range of 0 degree to 10 degrees. The viewing angle adjusting layer 120 is also arranged on the transmission path P and located between the first polarizing layer 110 and the second polarizing layer 112, and used for changing the range of the emitted light viewing angle (light-emitting range, for example) of the display beam DB, for example, from the wide emitted light viewing angle to the narrow emitted light viewing angle. The touch sensing layer 130 is used for sensing a touch event generated by a user. The touch sensing layer 130 is arranged on the transmission path P. In the embodiment, the touch sensing layer 130 is arranged above the viewing angle adjusting layer 120 and opposite to the first polarizing layer 110 on the transmission path P. That is, the viewing angle adjusting layer 120 is located between the touch sensing layer 130 and the first polarizing layer 110.

It should be noted that the touch sensing layer 130 of the disclosure can be applied to an externally mounted or an embedded touch panel technology. In the embodiment, the touch sensing layer 130 is attached to a surface of the second polarizing layer 112 and is attached to the surface of the second polarizing layer 112 away from the first polarizing layer 110, so that the touch sensing layer 130 can be stably fixed to the surface of the second polarizing layer 112, thereby avoiding a decrease in the touch recognition caused by insufficient change of the capacitance due to thickness (a distance between a touch object and the touch sensing layer 130, for example). Various configurations of the touch sensing layer 130 will be further described in other embodiments below.

The screen anti-peeping protection layer 100' further includes a first substrate 140 and a second substrate 142. The first substrate 140 and the second substrate 142 are sequentially arranged on the transmission path P of the display beam DB, and located between the first polarizing layer 110 and the second polarizing layer 112, and the viewing angle adjusting layer 120 is located between the first substrate 140 and the second substrate 142. Specifically, the first substrate 140 or the second substrate 142 is general glass or strengthened glass (tempered glass, for example). The strengthened glass may be air-cooled strengthened glass, heat strengthened glass, chemically strengthened glass, or the like, and the disclosure is not limited thereto. Since the surface of the strengthened glass has a compressive stress layer, the mechanical strength is high, and the touch display device 10 can be provided with a more excellent impact protection function.

The viewing angle adjusting layer 120 includes a liquid crystal layer 150, a first alignment layer 122, a second alignment layer 124, a first electrode 126 and a second electrode 128. The first electrode 126 and the second electrode 128 (plane electrode, for example) are respectively arranged on two opposite sides of the liquid crystal layer 150, and used for providing an applied voltage to the liquid crystal layer 150 to change the arrangement direction of the liquid crystal molecules of the liquid crystal layer 150. The liquid crystal molecules of the liquid crystal layer 150 are, for example, twisted nematic (TN) liquid crystals, but not limited thereto. The first alignment layer 122 and the second alignment layer 124 are similarly respectively arranged on two opposite sides of the liquid crystal layer 150. The first alignment layer 122 is located between the first electrode 126 and the liquid crystal layer 150, and the second alignment layer 124 is located between the liquid crystal layer 150 and the second electrode 128. The alignment directions of the second alignment layer 124 and the first alignment layer 122 are antiparallel or nearly antiparallel to each other. In the embodiment, the angle between the alignment directions of the second alignment layer 124 and the first alignment layer 122 falls within the range of 170 degrees to 190 degrees.

In addition, the first alignment layer 122 is arranged between the liquid crystal layer 150 and the first polarizing layer 110, and the second alignment layer 124 is arranged between the liquid crystal layer 150 and the second polarizing layer 112. The direction of the absorption axis of the first polarizing layer 110 or the second polarizing layer 112 is parallel or perpendicular or nearly parallel or perpendicular to the alignment direction of the corresponding alignment layer. In the embodiment, the angle between the absorption axis of the first polarizing layer 110 and the alignment direction of the first alignment layer 122 falls within the range of 0 degree to 15 degrees or in the range of 75 degrees to 105 degrees. The angle between the absorption axis of the second polarizing layer 112 and the alignment direction of the second alignment layer 124 falls within the range of 0 degree to 15 degrees or in the range of 75 degrees to 105 degrees.

Figure 3B:
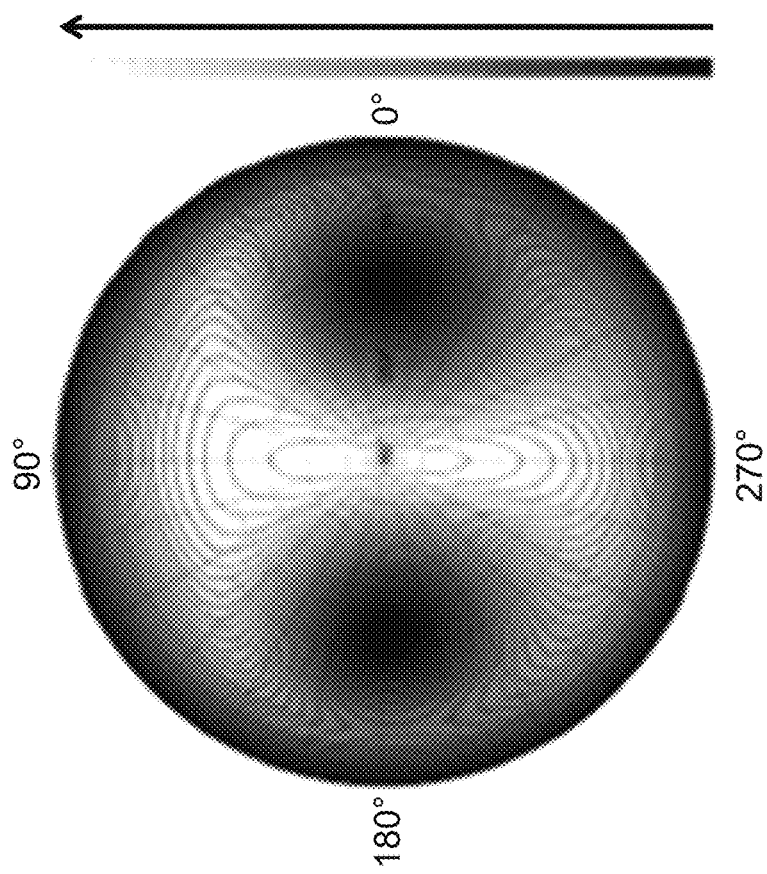
FIG. 3A and FIG. 3B are respectively different emitted light field pattern distribution views of the touch display device according to an embodiment of the disclosure.
Figure 3A:
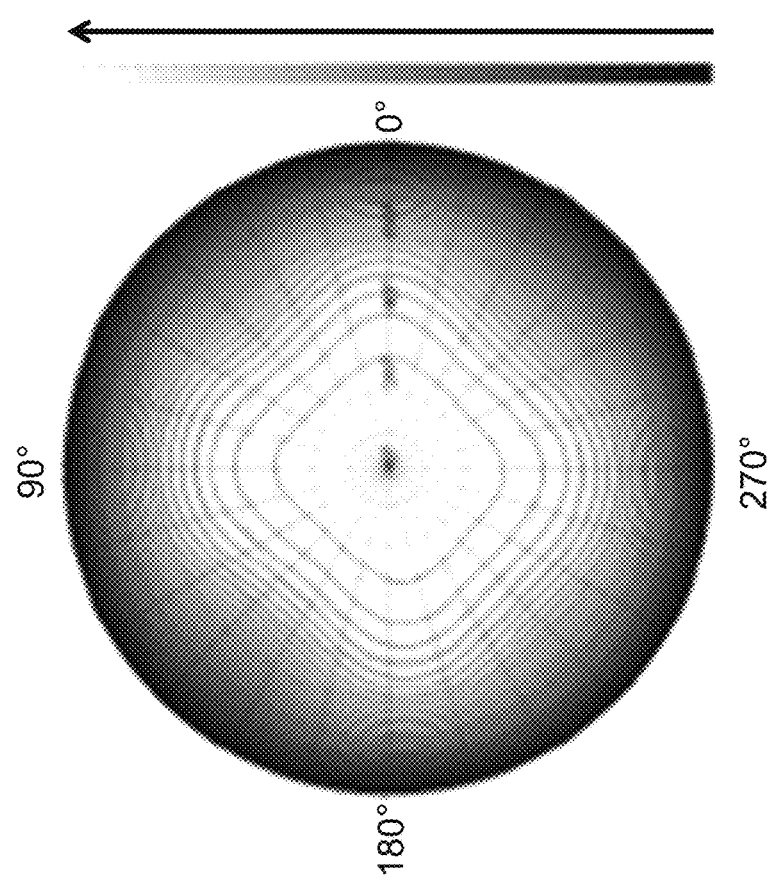

FIG. 3A and FIG. 3B are respectively different emitted light field pattern distribution views of the touch display device according to an embodiment of the disclosure. With continued reference with FIG. 3A and FIG. 3B, the liquid crystal molecules in the liquid crystal layer 150 change their arrangement direction according to the applied voltage between the first electrode 126 and the second electrode 128 to change the emitted light viewing angle of the display beam DB. For example, when the applied voltage is equal to 0 V (volt), the range of the emitted light viewing angle after the display beam DB penetrates the viewing angle adjusting layer 120 is as shown in FIG. 3A. At this time, after the display beam DB penetrates the viewing angle adjusting layer 120, the difference in the intensity of emitted light at each angle is not large, and thus the touch display device 10 has a wide viewing angle and is in the normal viewing mode. When the applied voltage is greater than 0 V (3V or 5V, for example), the display beam DB is affected by the liquid crystal molecules of the liquid crystal layer 150 to change the polarization state when penetrating the viewing angle adjusting layer 120, thereby changing the emitted light field pattern. The range of the emitted light viewing angle after the display beam DB penetrates the viewing angle adjusting layer 120 is as shown in FIG. 3B, and the viewing angle range is significantly narrowed (in the horizontal direction, for example). At this time, for other people beside the user, the display image of the touch display device 10 cannot be clearly seen. Therefore, the touch display device 10 is in the anti-peeping mode, and has the effect of protecting privacy. It should be additionally noted that in the embodiment of FIG. 3B, the display beam DB leaves the touch display device 10 at a front viewing angle (the viewing angle in the direction perpendicular to the display panel 200) is hardly affected by the liquid crystal molecules, and the viewer in the front viewing direction can still obtain good display image quality.

In the embodiment, the first electrode 126 or the second electrode 128 may be a one-piece transparent electrode layer (plane electrode, for example). Preferably, no pattern (conductive pattern, for example) is arranged on the surface thereof to reduce or eliminate electromagnetic interference that may be received by the touch sensing layer 130 there above, which helps to maintain the recognition accuracy of the touch sensing layer 130.

Refer to FIG. 1 and FIG. 2. In the embodiment, the display panel 200 is a liquid crystal display panel, but not limited thereto. In other embodiments, the display layer panel 200 is an electro-phoretic display (EPD), a light emitting diode (LED) display panel, or other types of display technologies. The display panel 200 of the embodiment includes at least a display layer 210, a third polarizing layer 220 and a fourth polarizing layer 230. The display layer 210 is also a liquid crystal layer, the third polarizing layer 220 and the fourth polarizing layer 230 are arranged on two opposite sides of the display layer 210, and the directions of the absorption axes of the third polarizing layer 220 and the fourth polarizing layer 230 are parallel or perpendicular to each other. When the fourth polarizing layer 230 is located between the first polarizing layer 110 and the display layer 210, the directions of the absorption axes of the fourth polarizing layer 230 and the first polarizing layer 110 are parallel to each other. In another embodiment, the touch display device 10 further includes a phase retarder 240 arranged between the fourth polarizing layer 230 and the first polarizing layer 110. At this time, the directions of the absorption axes of the fourth polarizing layer 230 and the first polarizing layer 110 may also be at an angle. For example, when the phase retarder 240 is a half wave plate, the directions of the absorption axes of the fourth polarizing layer 230 and the first polarizing layer 110 are perpendicular to each other.

In another embodiment, since the display panel 200 has the fourth polarizing layer 230 and the display beam DB (the light beam after penetrating the fourth polarizing layer 230) is polarized, the touch display device 10 can integrate the functions of the first polarizing layer 110 and the fourth polarizing layer 230, so that the display panel 200 and the screen anti-peeping protection layer 100 share the same polarizing layer to simplify the structure, that is, one polarizing layer is used to replace the first polarizing layer 110 and the fourth polarizing layer 230.

In another embodiment, the first polarizing layer 110 of the screen anti-peeping protection layer 100' may employ a reflective polarizer. When the applied voltage is greater than 0 V, the ambient light is reflected by the reflective polarizer and then leaves the touch display device 10 after passing through the liquid crystal layer 150, and interferes with the display beam DB leaving the touch display device 10, thereby further enhancing the anti-peeping effect.

In short, the display panel 200 emits a display beam DB for displaying an image, and the screen anti-peeping protection layer 100 is arranged above the display panel 200 to protect the display panel 200 and adjust the range of the emitted light viewing angle of the display beam DB, so that the touch display device 10 can switch between the normal viewing mode and the anti-peeping mode according to the applied voltage. The screen anti-peeping protection layer 100 further includes a touch sensing layer 130 such that the touch display device 10 has a touch function. The touch sensing layer 130 can be stably fixed on the second polarizing layer 112 or the second substrate 142, so as to prevent the user from moving or shaking the viewing angle adjusting layer 120 or the touch sensing layer 130 by the finger or the stylus during the touch operation. In an embodiment, the substrate of the screen anti-peeping protection layer 100 may use strengthened glass to further avoid damage to the touch display device 10.

Figure 4:
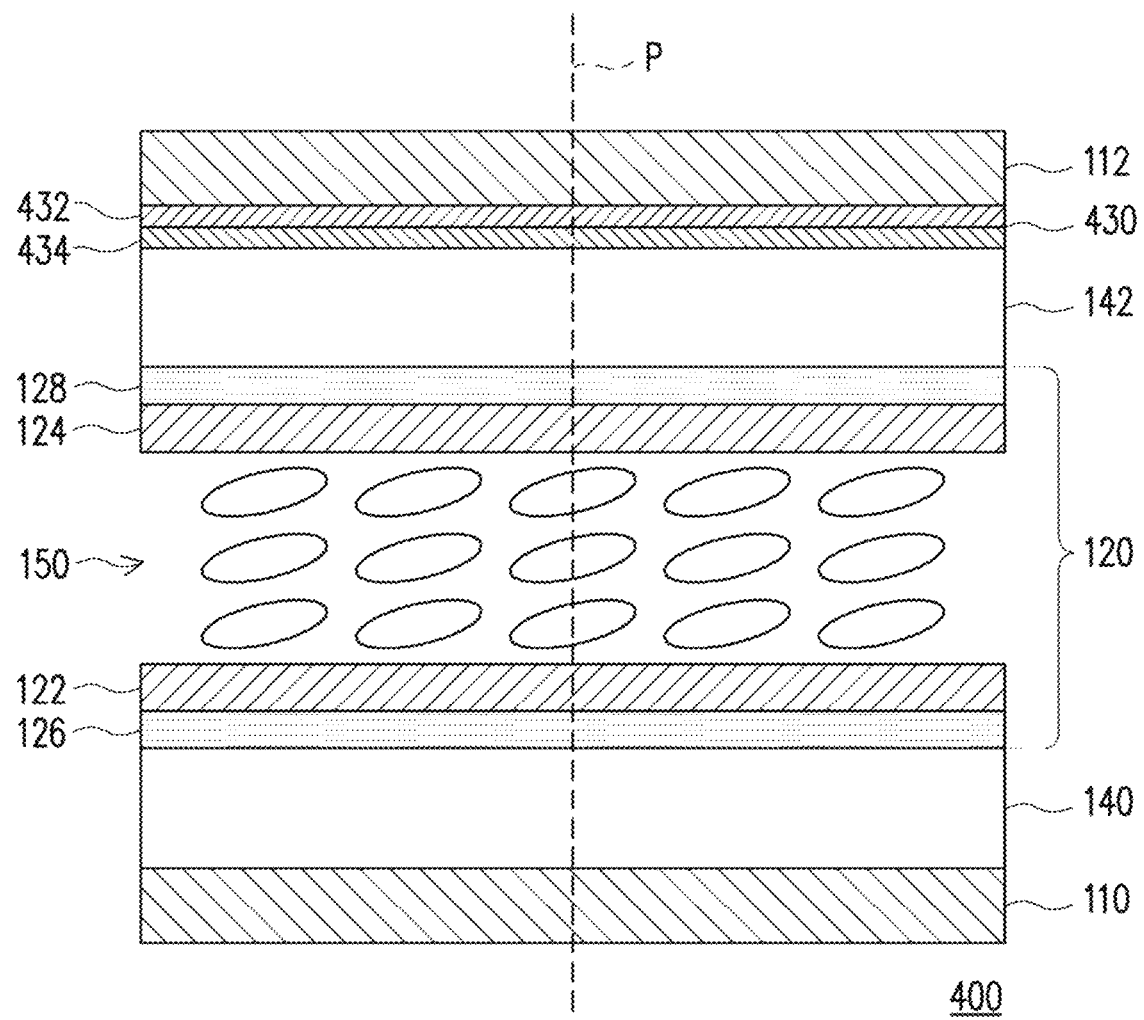
FIG. 4 is a schematic structural view of a screen anti-peeping protection layer according to another embodiment of the disclosure.

FIG. 4 is a schematic structural view of a screen anti-peeping protection layer according to another embodiment of the disclosure. Referring to FIG. 4 in conjunction with FIG. 1, the screen anti-peeping protection layer 400 of FIG. 4 can also be applied to the screen anti-peeping protection layer 100 of FIG. 1. The structure of the screen anti-peeping protection layer 400 is similar to that of the screen anti-peeping protection layer 100' of FIG. 2, the main difference being that the position of the touch sensing layer 430 is different from that of the touch sensing layer 130. In FIG. 4, the viewing angle adjusting layer 120 is still located between the first substrate 140 and the second substrate 142, but the touch sensing layer 430 is located between the second polarizing layer 112 and the second substrate 142. The touch sensing layer 430 of FIG. 4 is, for example, a film sensor, and includes at least one sending conductive layer 432 and at least one substrate layer 434. The sensing conductive layer 432 is arranged on the surface of the substrate layer 434. The sensing conductive layer 432 is, for example, a projected capacitive touch line (electrode, for example), and the substrate layer 434 is, for example, a polyimide (PI) film, but not limited thereto. The touch sensing layer 430 is arranged on the second substrate 142 by attaching the substrate layer 434 to the second substrate 142.

It should be particularly noted that the optical axis of each substrate layer 434 is parallel or perpendicular to the absorption axis of the second polarizing layer 112 or the in-plane compensation value of each substrate layer 434 is less than or equal to 10 nanometers (nm). In addition, the substrate layer 434 may also function as a compensation film, and the sum of the out-of-plane compensation values as the compensation film preferably falls within the range of 200 nanometers to 700 nanometers, or falls within the range of 400 nanometers to 500 nanometers.

Figure 5:
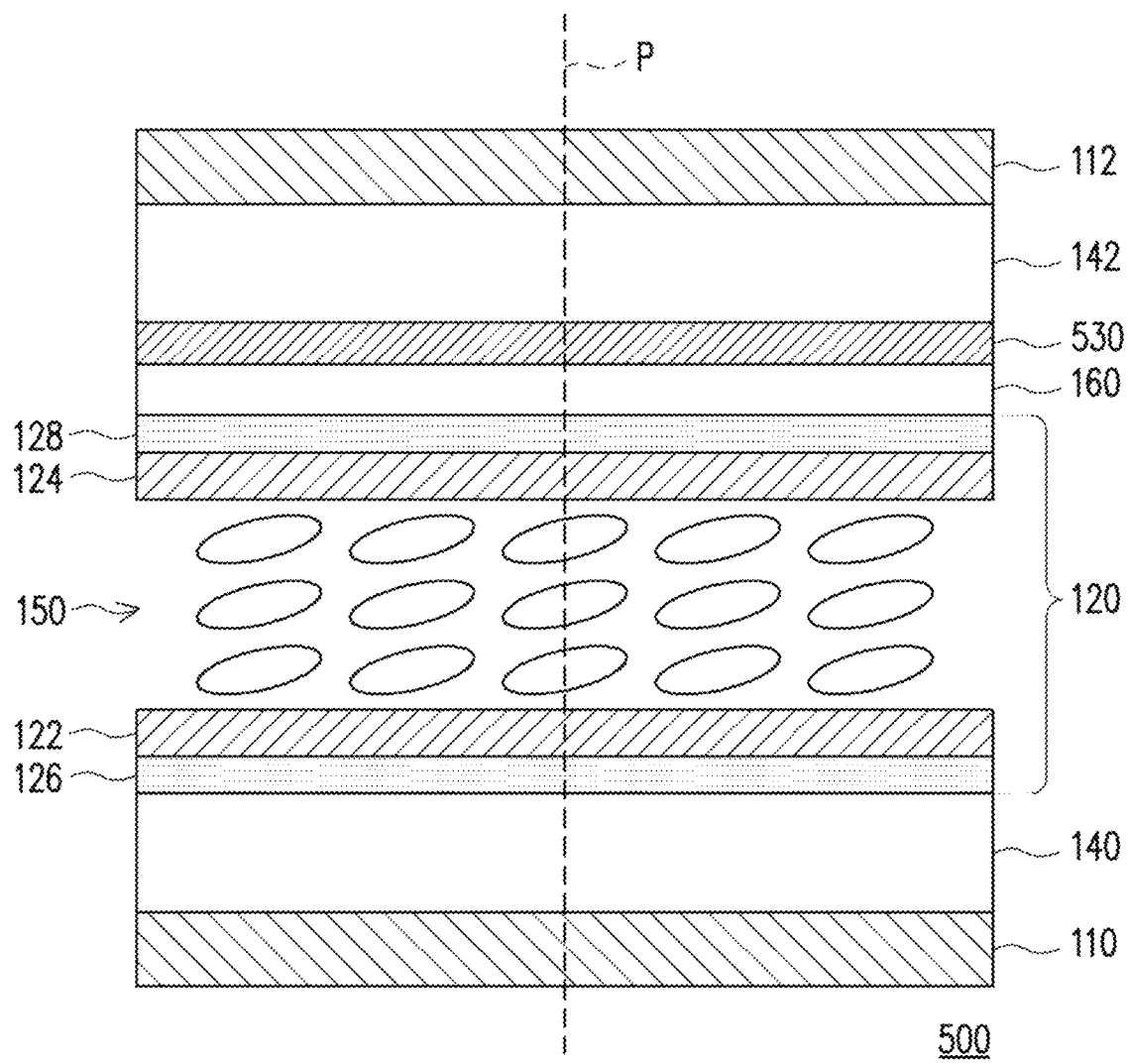
FIG. 5 is a schematic structural view of a screen anti-peeping protection layer according to another embodiment of the disclosure.

FIG. 5 is a schematic structural view of a screen anti-peeping protection layer according to another embodiment of the disclosure. Referring to FIG. 5 in conjunction with FIG. 1, the screen anti-peeping protection layer 500 of FIG. 5 can also be applied to the screen anti-peeping protection layer 100 of FIG. 1. The structure of the screen anti-peeping protection layer 500 is similar to that of the screen anti-peeping protection layer 100' of FIG. 2, the main difference being that the position of the touch sensing layer 530 is different from that of the touch sensing layer 130. The touch sensing layer 530 is located between the second substrate 142 and the viewing angle adjusting layer 120. In the embodiment, the touch sensing layer 530 and the viewing angle adjusting layer 120 may further includes an insulating layer 160 for isolating the touch sensing layer 530 from the viewing angle adjusting layer 120 or the display panel 200 there below. The touch sensing layer 530 can be directly formed on the surface of the second substrate 142. For example, the touch sensing layer 530 is a single-sided ITO (SITO) or double-sided ITO (DITO) touch technology using a projected capacitor, but not limited thereto.

It is to be noted that the touch sensing layer 130 of FIG. 2 or the touch sensing layer 530 of FIG. 5 may also include a sensing conductive layer and a substrate layer, but the in-plane compensation values of the substrate layers of the touch sensing layer 130 and the touch sensing layer 530 are not particularly limited. For example, the substrate layer of the touch sensing layer 130 may be made of a polymethyl methacrylate (PMMA) material.

Figure 6:
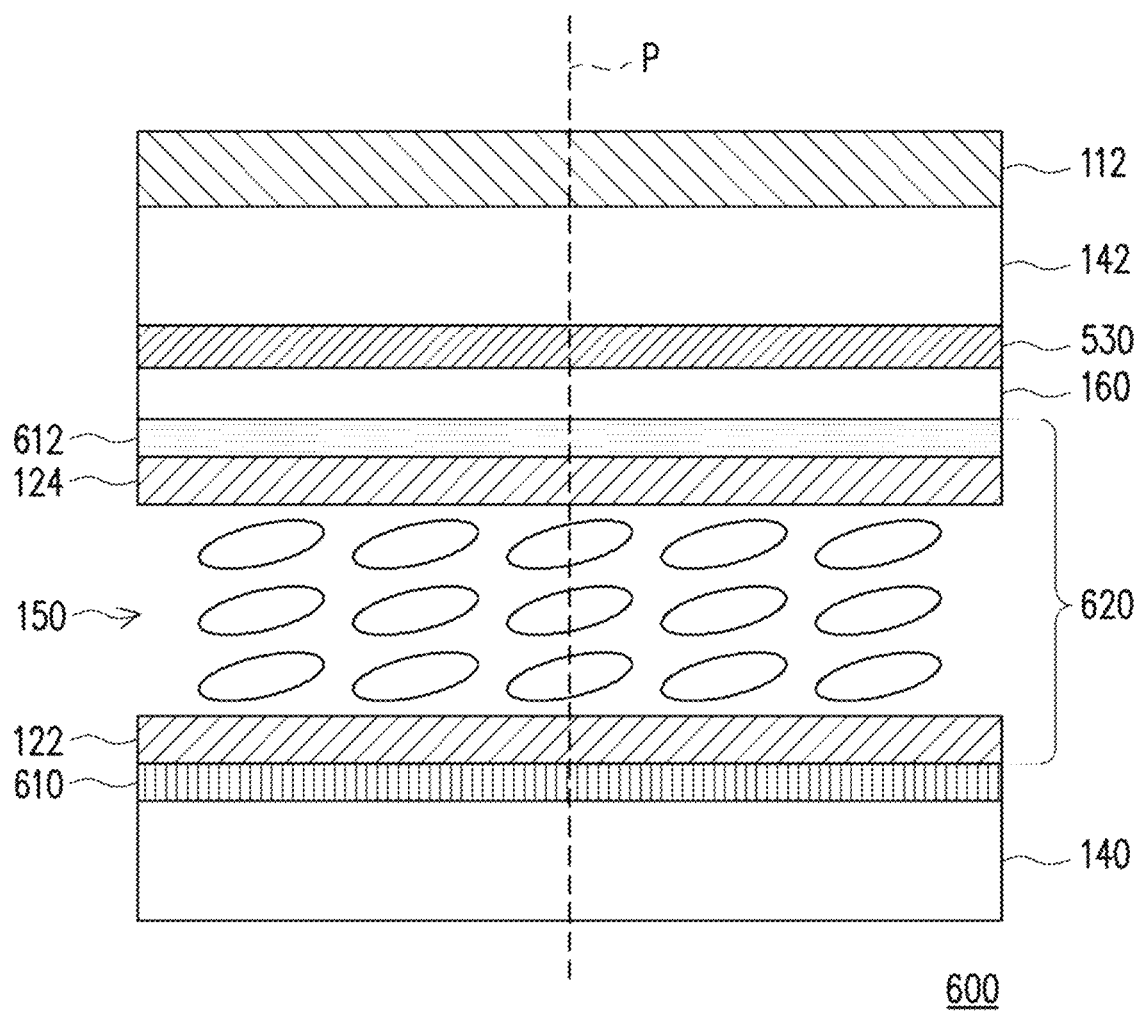
FIG. 6 is a schematic structural view of a screen anti-peeping protection layer according to another embodiment of the disclosure.

FIG. 6 is a schematic structural view of a screen anti-peeping protection layer according to another embodiment of the disclosure. Referring to FIG. 6 in conjunction with FIG. 1, the screen anti-peeping protection layer 600 of FIG. 6 can also be applied to the screen anti-peeping protection layer 100 of FIG. 1. The structure of the screen anti-peeping protection layer 600 is similar to that of the screen anti-peeping protection layer 500 of FIG. 5, but the first polarizing layer of the screen anti-peeping protection layer 600 includes a metal grating polarizer 610. Specifically, the viewing angle adjusting layer 620 of the screen anti-peeping protection layer 600 includes a liquid crystal layer 150, a first alignment layer 122, a second alignment layer 124 and an electrode 612. The electrode 612 and the metal grating polarizer 610 are respectively arranged on two opposite sides of the liquid crystal layer 150 to provide an applied voltage to the liquid crystal layer 150. The first alignment layer 122 is between the metal grating polarizer 610 and the liquid crystal layer 150, and the second alignment layer 124 is between the electrode 612 and the liquid crystal layer 150. In the embodiment, the metal grating polarizer 610 can provide a polarization function and an electrode function. Therefore, the metal grating polarizer 610 can replace the first electrode 126 in the viewing angle adjusting layer 120 in addition to providing the polarization function, so the screen anti-peeping protection layer 600 may omit a polarizing layer between the first substrate 140 and the display panel 200.

It is to be noted that the manner in which the touch sensing layer 130 and the touch sensing layer 430 are arranged can still be applied to the screen anti-peeping protection layer 600.

Figure 7:
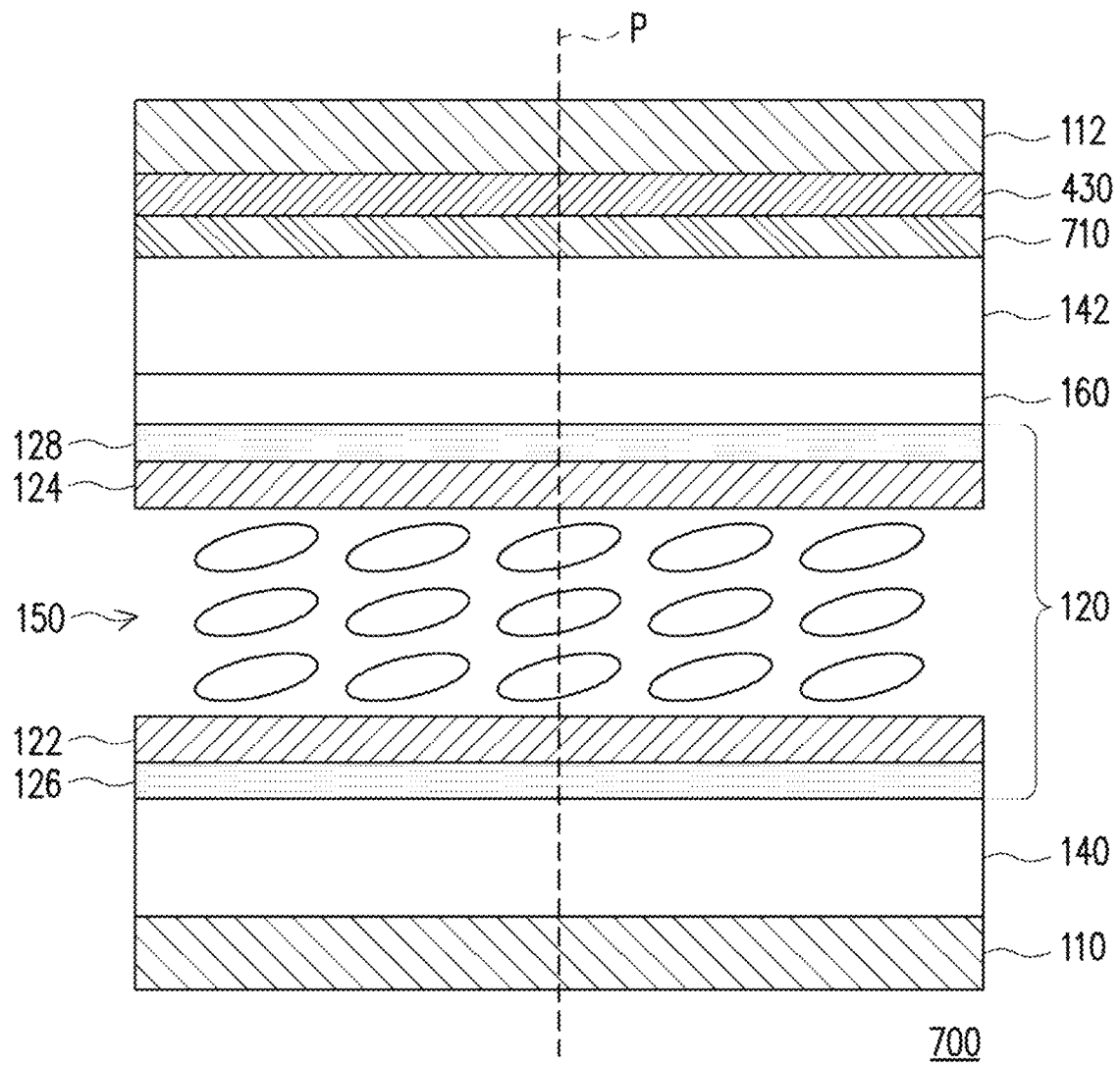
FIG. 7 is a schematic structural view of a screen anti-peeping protection layer according to another embodiment of the disclosure.

FIG. 7 is a schematic structural view of a screen anti-peeping protection layer according to another embodiment of the disclosure. Referring to FIG. 7 in conjunction with FIG. 1, the screen anti-peeping protection layer 700 of FIG. 7 can also be applied to the screen anti-peeping protection layer 100 of FIG. 1. The structure of the screen anti-peeping protection layer 700 is similar to that of the screen anti-peeping protection layer 400 of FIG. 4, but the screen anti-peeping protection layer 700 further includes at least one optical compensation film 710. The optical compensation film 710 is arranged on the transmission path P and located between the first polarizing layer 110 and the second polarizing layer 112. The sum of the out-of-plane compensation values of the optical compensation film 710 falls within the range of 200 nanometers to 700 nanometers. In the embodiment, the out-of-plane compensation value of the optical compensation film 710 falls within the range of 400 nanometers to 500 nanometers. It should be noted that, in the embodiment, the optical compensation film 710 is arranged between the second polarizing layer 112 and the second substrate 142, but the disclosure is not limited thereto. A person skilled in the art may choose to add an optical compensation film 710 between the first polarizing layer 110 and the second polarizing layer 112 according to actual needs and structural design. The above-mentioned screen anti-peeping protection layers 100' and 500 may also be additionally provided with an optical compensation film 710 between the first polarizing layer 110 and the second polarizing layer 112, and the screen anti-peeping protection layer 600 may also be additionally provided with an optical compensation film 710 on the metal grating polarizer 610 and the second polarizing layer 112.

Based on the above, the embodiments of the disclosure provide a screen anti-peeping protection layer and a touch display device. The screen anti-peeping protection layer is arranged on the display panel to provide a protection function, a touch function and a viewing angle adjustment function. The touch display device is controlled to switch between the wide viewing angle mode and the anti-peeping mode through the viewing angle adjusting layer in the screen anti-peeping protection layer without affecting the display quality of the front viewing angle. The touch sensing layer is arranged above the viewing angle adjusting layer. The screen anti-peeping protection layer can be well combined with the touch sensing layer and the viewing angle adjusting layer, so that the touch sensing layer and the viewing angle adjusting layer are stably arranged in the screen anti-peeping protection layer, thereby avoiding the problem that the recognition of the touch sensing layer is not good due to insufficient change of the sensing capacitance during touch operation by a user or the problem that the viewing angle adjusting layer is moved when the finger slides.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may use "first", "second", etc. followed with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A screen anti-peeping protection layer, arranged above a display panel, wherein the screen anti-peeping protection layer comprises a first polarizing layer, a second polarizing layer, a viewing angle adjusting layer and a touch sensing layer, wherein:
   the first polarizing layer and the second polarizing layer are sequentially arranged on a transmission path of a display beam, wherein the display beam comes from the display panel;
   the viewing angle adjusting layer is arranged on the transmission path and located between the first polarizing layer and the second polarizing layer, and used for changing a range of an emitted light viewing angle of the display beam;
   the touch sensing layer is arranged on the transmission path, and located above the viewing angle adjusting layer and opposite to the first polarizing layer; and
   the viewing angle adjusting layer comprises a liquid crystal layer, a first electrode, a second electrode, a first alignment layer and a second alignment layer, wherein:
      the first electrode and the second electrode are respectively arranged on two opposite sides of the liquid crystal layer and used for supplying an applied voltage to the liquid crystal layer;
      the first alignment layer and the second alignment layer are respectively arranged on two opposite sides of the liquid crystal layer, wherein the first alignment layer is located between the first electrode and the liquid crystal layer, and the second alignment layer is located between the liquid crystal layer and the second electrode;
      an angle between the alignment directions of the second alignment layer and the first alignment layer falls within a range of 170 degrees to 190 degrees; and
      the first alignment layer is arranged between the liquid crystal layer and the first polarizing layer, and the second alignment layer is arranged between the liquid crystal layer and the second polarizing layer, wherein an angle between the absorption axis of the first polarizing layer and the alignment direction of the first alignment layer falls within a range of 0 degree to 15 degrees or within a range of 75 degrees to 105 degrees, and an angle between the absorption axis of the second polarizing layer and the alignment direction of the second alignment layer falls within a range of 0 degree to 15 degrees or within a range of 75 degrees to 105 degrees.

2. The screen anti-peeping protection layer according to claim 1, wherein the touch sensing layer is attached to a surface of the second polarizing layer, and the surface is a surface away from the first polarizing layer.

3. The screen anti-peeping protection layer according to claim 1, further comprising:
   a first substrate and a second substrate, sequentially arranged on the transmission path, and located between the first polarizing layer and the second polarizing layer,
   wherein the viewing angle adjusting layer is located between the first substrate and the second substrate, and the touch sensing layer is located between the second polarizing layer and the second substrate.

4. The screen anti-peeping protection layer according to claim 3, wherein the touch sensing layer comprises at least one sensing conductive layer and at least one substrate layer, and the in-plane compensation value of each of the at least one substrate layer is less than or equal to 10 nanometers.

5. The screen anti-peeping protection layer according to claim 4, wherein the sum of the out-of-plane compensation values of the at least one substrate layer falls within a range of 200 nanometers to 700 nanometers.

6. The screen anti-peeping protection layer according to claim 3, wherein the first substrate or the second substrate is strengthened glass.

7. The screen anti-peeping protection layer according to claim 1, further comprising:
   a first substrate and a second substrate, sequentially arranged on the transmission path, and located between the first polarizing layer and the second polarizing layer,
   wherein the viewing angle adjusting layer is located between the first substrate and the second substrate, and the touch sensing layer is located between the second substrate and the viewing angle adjusting layer.

8. The screen anti-peeping protection layer according to claim 1, wherein an angle between the absorption axes of the first polarizing layer and the second polarizing layer falls within a range of 0 degree to 10 degrees.

9. The screen anti-peeping protection layer according to claim 1, wherein the first polarizing layer comprises a reflective polarizer.

10. The screen anti-peeping protection layer according to claim 1, further comprising:
   at least one optical compensation film, arranged on the transmission path and located between the first polarizing layer and the second polarizing layer, wherein the sum of the out-of-plane compensation values of the at least one optical compensation film falls within a range of 200 nanometers to 700 nanometers.

11. The screen anti-peeping protection layer according to claim 10, wherein the sum of the out-of-plane compensation values of the at least one optical compensation film falls within a range of 400 nanometers to 500 nanometers.

12. A screen anti-peeping protection layer, arranged above a display panel, wherein the screen anti-peeping protection layer comprises a first polarizing layer, a second polarizing layer, a viewing angle adjusting layer and a touch sensing layer, wherein:
   the first polarizing layer and the second polarizing layer are sequentially arranged on a transmission path of a display beam, wherein the display beam comes from the display panel;
   the viewing angle adjusting layer is arranged on the transmission path and located between the first polarizing layer and the second polarizing layer, and used for changing a range of an emitted light viewing angle of the display beam;
   the touch sensing layer is arranged on the transmission path, and located above the viewing angle adjusting layer and opposite to the first polarizing layer;
   the first polarizing layer comprises a metal grating polarizer; and
   the viewing angle adjusting layer comprises a liquid crystal layer, a first alignment layer, a second alignment layer and an electrode, wherein:
      the first alignment layer and the second alignment layer are respectively arranged on two opposite sides of the liquid crystal layer; and
      the electrode and the metal grating polarizer are respectively arranged on two opposite sides of the liquid crystal layer to provide an applied voltage to the liquid crystal layer, wherein the first alignment layer is located between the metal grating polarizer and the liquid crystal layer, and the second alignment layer is located between the electrode and the liquid crystal layer.

13. A touch display device, wherein the touch display device comprises a display panel and a screen anti-peeping protection layer, wherein:
   the display panel is used for emitting a display beam; and
   the screen anti-peeping protection layer is arranged on a transmission path of the display beam, and comprises a first polarizing layer, a second polarizing layer, a viewing angle adjusting layer and a touch sensing layer, wherein:
      the first polarizing layer and the second polarizing layer are sequentially arranged on the transmission path;
      the viewing angle adjusting layer is arranged on the transmission path and located between the first polarizing layer and the second polarizing layer, and used for changing a range of an emitted light viewing angle of the display beam;
      the touch sensing layer is arranged on the transmission path, and located above the viewing angle adjusting layer and opposite to the second polarizing layer; and
      the viewing angle adjusting layer comprises a liquid crystal layer, a first electrode, a second electrode, a first alignment layer and a second alignment layer, wherein:
         the first electrode and the second electrode are respectively arranged on two opposite sides of the liquid crystal layer and used for supplying an applied voltage to the liquid crystal layer;
         the first alignment layer and the second alignment layer are respectively arranged on two opposite sides of the liquid crystal layer, wherein the first alignment layer is located between the first electrode and the liquid crystal layer, and the second alignment layer is located between the liquid crystal layer and the second electrode;
         an angle between the alignment directions of the second alignment layer and the first alignment layer falls within a range of 170 degrees to 190 degrees; and
         the first alignment layer is arranged between the liquid crystal layer and the first polarizing layer, and the second alignment layer is arranged between the liquid crystal layer and the second polarizing layer, wherein an angle between the absorption axis of the first polarizing layer and the alignment direction of the first alignment layer falls within a range of 0 degree to 15 degrees or within a range of 75 degrees to 105 degrees, and an angle between the absorption axis of the second polarizing layer and the alignment direction of the second alignment layer falls within a range of 0 degree to 15 degrees or within a range of 75 degrees to 105 degrees.

14. The touch display device to claim 13, wherein the display panel comprises:
   a display layer; and
   a third polarizing layer and a fourth polarizing layer, arranged on two opposite sides of the display layer, wherein the directions of the absorption axes of the third polarizing layer and the fourth polarizing layer are parallel or perpendicular to each other.

15. A touch display device, wherein the touch display device comprises a display panel and a screen anti-peeping protection layer, wherein:
   the display panel is used for emitting a display beam; and
   the screen anti-peeping protection layer is arranged on a transmission path of the display beam, and comprises a first polarizing layer, a second polarizing layer, a viewing angle adjusting layer and a touch sensing layer, wherein:

the first polarizing layer and the second polarizing layer are sequentially arranged on the transmission path;

the viewing angle adjusting layer is arranged on the transmission path and located between the first polarizing layer and the second polarizing layer, and used for changing a range of an emitted light viewing angle of the display beam;

the touch sensing layer is arranged on the transmission path, and located above the viewing angle adjusting layer and opposite to the second polarizing layer, the first polarizing layer comprises a metal grating polarizer; and the viewing angle adjusting layer comprises a liquid crystal layer, a first alignment layer, a second alignment layer and an electrode, wherein:
- the first alignment layer and the second alignment layer are respectively arranged on two opposite sides of the liquid crystal layer; and
- the electrode and the metal grating polarizer are respectively arranged on two opposite sides of the liquid crystal layer to provide an applied voltage to the liquid crystal layer, wherein the first alignment layer is located between the metal grating polarizer and the liquid crystal layer, and the second alignment layer is located between the electrode and the liquid crystal layer.

* * * * *